United States Patent
Lotfi et al.

(10) Patent No.: US 11,843,540 B2
(45) Date of Patent: Dec. 12, 2023

(54) SYSTEM AND METHOD FOR DETERMINISTIC HASH ADDRESSING

(71) Applicant: Fastly, Inc., San Francisco, CA (US)

(72) Inventors: Hossein Lotfi, Bellevue, WA (US); Janardhan Iyengar, Truckee, CA (US); Patrick R. McManus, Warren, ME (US); Artur Bergman, Denver, CO (US); Joel Jaeggli, Mountain View, CA (US); Ryan Landry, Denver, CO (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 17/687,352

(22) Filed: Mar. 4, 2022

(65) Prior Publication Data

US 2022/0286398 A1 Sep. 8, 2022

Related U.S. Application Data

(60) Provisional application No. 63/186,937, filed on May 11, 2021, provisional application No. 63/157,261, filed on Mar. 5, 2021.

(51) Int. Cl.
*H04L 45/7453* (2022.01)

(52) U.S. Cl.
CPC .............................. *H04L 45/7453* (2013.01)

(58) Field of Classification Search
CPC ........... H04L 45/7453; H04L 67/10015; H04L 67/562; H04L 67/1023
See application file for complete search history.

(56) References Cited

U.S. PATENT DOCUMENTS

| | | | |
|---|---|---|---|
| 8,248,928 B1* | 8/2012 | Wang | H04L 43/026 370/230 |
| 2010/0322076 A1* | 12/2010 | Goel | H04L 69/22 370/236 |
| 2014/0310418 A1 | 10/2014 | Sorenson et al. | |
| 2018/0198854 A1 | 7/2018 | Rong et al. | |
| 2020/0059514 A1* | 2/2020 | Buytenhek | H04L 47/2441 |

* cited by examiner

*Primary Examiner* — Jung H Park (57) ABSTRACT

Methods and apparatus are disclosed herein that enable an infrastructure service to route messages to various servers, even if the servers are not addressed by individual public network addresses. The infrastructure service distributed messages by processing a portion of the message through a hash function. By utilizing a reverse hash process, a server can determine a custom port number that will cause the hash algorithm to route a reply message directly to the selected server even when addressed to a communal address.

14 Claims, 9 Drawing Sheets

SYSTEM AND METHOD FOR DETERMINISTIC HASH ADDRESSING

RELATED APPLICATIONS

This application claims the benefit of and priority to U.S. Patent Application No. 63/157,261, filed Mar. 5, 2021, entitled "System and Method for Deterministic Hash Addressing," and to U.S. Patent Application No. 63/186,937, filed on May 11, 2021, entitled "System and Method for Deterministic Hash Addressing," both of which are hereby incorporated by reference in their entirety.

TECHNICAL FIELD

Aspects of the disclosure are related to the field of computing and communication networks and, more particularly, to the enhanced handling of server selection utilizing a known hash algorithm.

BACKGROUND

Content delivery networks, edge cloud platforms, and other types of computing and communications infrastructure utilize load balancers to distribute traffic across servers. A typical load balancer receives incoming traffic from end users and directs it to various servers in accordance with a load balancing algorithm. The various servers also receive traffic from other network elements (such as users, cache servers, origin servers, etc.) that is directly addressed to the server. It may not be desirable for the load balancer to act on this other traffic.

Typically, each server is allotted one or more network addresses that directly address the server. Incoming traffic that is directed to the load balancer can be addressed to the load balancer, and other network traffic directed to one of the servers can be addressed directly to the server. Network addresses can be limited in supply. In some cases, a communications infrastructure may desire to limit the public addresses assigned to the servers. This can be done by addressing the load balancer and the servers communally, such that the individual servers do not have a unique public network address. The load balancer can typically address the various servers using private addresses, even if no unique public network address is assigned to the server.

This communal addressing works well when the traffic is originated from external networks, but can present a problem if a connection is originated by the load balanced servers. If the return traffic on this connection passes through the load balancer, this traffic may end up directed to a different server (other than the server that originated the connection) that will not know how to handle the traffic. As presented below, by utilizing a hash algorithm to distribute traffic through the load balancer and taking advantage of the advance knowledge of the hash algorithm, the communications infrastructure can correctly direct traffic to the appropriate server.

OVERVIEW

Technology is disclosed herein for distributing messages between servers, particularly where individual public server addresses are unavailable, in the context of computing and communications networks. In an implementation, an infrastructure service distributes incoming messages among a group of communally addressed servers. The service processes a portion of the incoming message through a hash algorithm to select one of the servers to receive and handle the message.

The service further selects the server to receive content form an origin server. A request for content is sent to the origin server, with the request containing information that is expected to be copied into the returning content message. This information is selected with knowledge of a hash function to predetermine the results of the hash function when the message returns from the origin server. The actual message is received from the origin server, and a portion of the message is processed through the hash algorithm. The hash algorithm produces the predetermined results, and the reply message is directed to the selected server. In this manner, a reply message can be directed to an individual server that is addressed communally.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein relates to systems and methods for routing incoming packet flows within infrastructure services such as content delivery networks, cloud edge platforms and other computing and communications environments. Particularly, the technology relates to externally addressing individual components or servers, particularly in situations where the individual components or servers do not have unique public addresses.

A group of individual servers can be associated together with a load balancer. These servers and the load balancer may share a single public network address. In this way, all traffic addressed to this public address will pass through the load balancer.

The load balancer can perform a hash algorithm on a portion of the incoming message in order to determine where to forward the incoming traffic. By using the hash algorithm, the load balancer can quickly distribute incoming traffic among the individual servers. In an implementation, the hash algorithm can produce a potential output for each of the individual servers or components based on a portion of the incoming message. In an implementation, this portion is an identifying value of the connection over which the message is transmitted. For example, the identifying value may be all, or a portion of a tuple associated with a connection, such as a protocol identifier, a source Internet protocol (IP) address, a source port, a destination IP address, and a destination port.

The individual components or servers may also periodically originate a connection with an external component, such as to request content from other external sources. For example, the servers may also function as cache servers, and periodically require content (such as web content, configuration data or telemetry information, for example) from origin servers. With no public network address, these external content requests can provide additional challenges.

In an implementation, when sending out a request for content from the origin servers, the individual servers or the load balancer can prepare the content request so that the returning content message will produce an expected result when the hash algorithm is performed on it. Thus, the returning content message will be routed to the correct individual server by the load balancer.

Figure 1:
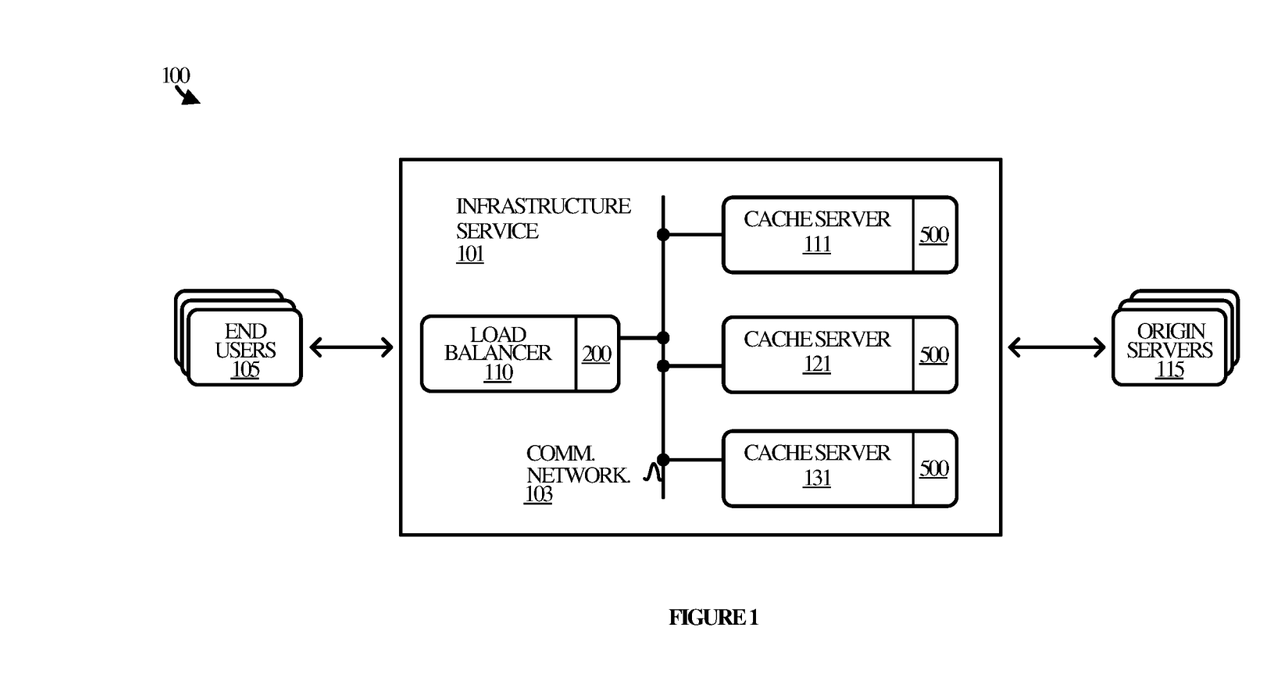
FIG. 1 illustrates an operational environment in an implementation.

Referring now to the drawings, FIG. 1 illustrates operational environment 100 in an implementation. Operational environment 100 includes infrastructure service 101, end users 105, and origin servers 115. Infrastructure service 101 is representative of a content delivery network, an edge cloud platform, or the like, and is comprised of various physical and/or virtual computing and communication elements suitable for implementing a variety of associated services. In particular, load balancer 110, cache server 111, cache server 121, and cache server 131 reside in infrastructure service 101 and exchange packets over communication network 103. Other equipment may be included in infrastructure service 101 but are omitted for the sake of clarity.

Figure 8:
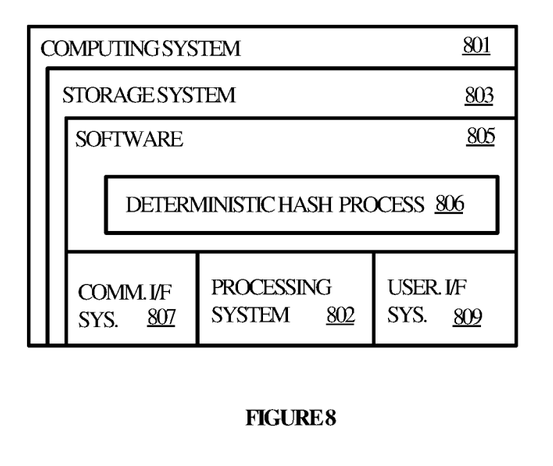
FIG. 8 illustrates a computing system suitable for implementing the various operational environments, architectures, processes, scenarios, and sequences discussed below with respect to the Figures.

Load balancer 110 is representative of any physical or virtual computing equipment capable of distributing incoming packet traffic across various servers. Load balancer 110 may be implemented on one or more computing systems, of which computing system 801 in FIG. 8 is representative. Load balancer 110 may employ, for example, a hash algorithm, a round-robin algorithm, a random (or pseudo random) algorithm, or any other type of algorithm, combination, or variation thereof, to distribute traffic to cache server 111, cache server 121, and cache server 131. Load balancer 110 is stateless in that it does not track connections between end users and servers.

Cache server 111, cache server 121, and cache server 131 are each representative of any physical or virtual server computer or server network suitable for processing incoming requests for content from end users 105 and serving content to end users 105 in reply, of which computing system 801 is also broadly representative.

Communication network 103 is representative of any network or collection of networks (physical or virtual) over which load balancer 110 may communicate with cache servers 111, 121, and 131. Communication network 103 may include various elements, such as switches, routers, and cabling to connect the various elements of infrastructure service 101. Communication network 103 may be wired, wireless, or some combination of each. The elements may communicate with each other in accordance with any suitable protocol, for example Ethernet. Communication network 103 may include private network addresses for one or more of load balancer 110, cache servers 111, 121 and 131 and/or any other elements. Communication network 103 may function even if one or more of load balancer 110, cache servers 111, 121 and 131 and/or any other elements do not have public network addresses available to components outside of infrastructure service 101.

End users 105 are representative of the various computing devices from which requests may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end user computing device. End users 105 communicate with infrastructure service 101 over one or more public or private networks (e.g., the Internet), combination of networks, or variations thereof.

Origin servers 115 represent the source of content that maybe be cached by infrastructure service 101 in specific implementations. Origin servers 115 may be implemented on any physical or virtual computing system, of which computing system 801 in FIG. 8 is broadly representative. Examples of content that may be cached include text, images, video, web sites, objects, applications, or any other type of data, variation, or combination thereof. Origin servers 115 also communicate with infrastructure service 101 via one or more public or private networks, combination of networks, or variations thereof.

According to an implementation, origin servers 115 may have no network address with which to directly address one or more of cache servers 111, 121, or 131. Infrastructure service 101 may be addressed by a single public network address. Infrastructure service 101 may be addressed by multiple public network addresses, but the public addresses may not be assigned to one or more of cache servers 111, 121, and 131. Public addressing of network components is used to describe how an external component would send messages to the network component. Thus, when a network component has only one public network address, this means that an external component has only one address with which to send messages to the network component. This does not preclude a different external component from having a different address with which to address the same network component. In an implementation, one external component may have public addresses for cache servers. This external component can directly address the cache servers 111, 121 and/or 131. Another external component may not have public addresses for one or more of cache servers 111, 121 and 131. For this external component, one or more of cache servers 111, 121 and 131 are not publicly addressable, or have no public network address.

Regardless or whether cache servers 111, 121 and 131 are publicly addressable, in an implementation, load balancer 110 is used to distribute incoming content requests among cache servers 111, 121 and 131. While three cache servers 111, 121 and 131 are shown in FIG. 1, more (or fewer) cache servers could be included in infrastructure service 101.

Figure 2:
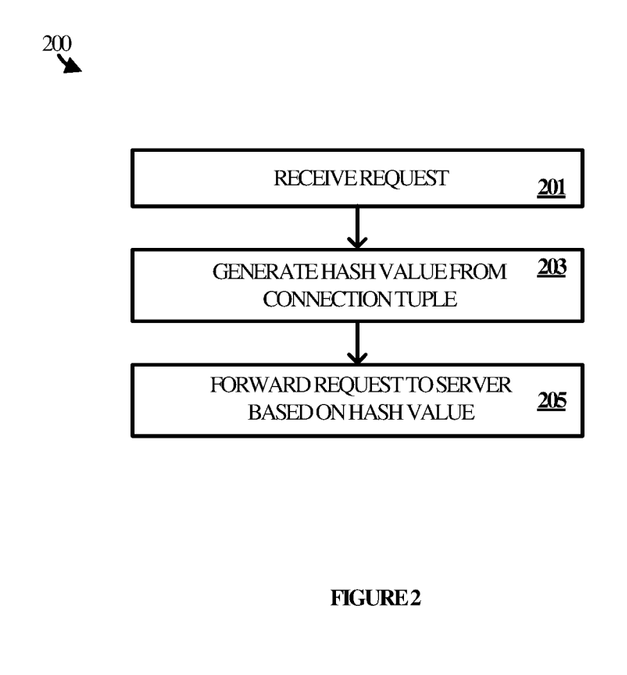
FIG. 2 illustrates a message distribution in an implementation.

In an implementation, load balancer 110 uses a hash algorithm to distribute content requests, as can be seen in FIG. 2. In Step 201, load balancer 110 receives a request. The request can originate from one of end user 105, one of origin servers 115, or some other network element. The request may be addressed directly to load balancer 110 or may be forwarded to load balancer 110 by another element of infrastructure service 101. While step 201 is described as receiving a request, any type of communication may be handled by the same process. As will be discussed below, content messages can be handled through the same process. Load balancer 110, in an implementation, may not know what type of message (i.e., request, content, etc.) is being distributed.

In step 203, load balancer 110 generates a hash value for the message that has been received. In an implementation, this hash value is generated from a connection tuple, which contains five pieces if information about the connection—source address, source port, destination address, destination port, and communication protocol. This connection tuple (or some other portion of the incoming message) is processed through a hash algorithm. The hash algorithm is designed to produce repeatable results. For example, if a given connection tuple is processed through the hash algorithm multiple times, it should produce the same hash value each time. In an embodiment, the hash algorithm is designed to provide the same number of output value options as cache servers 111, 121 and 131, i.e., three. If more cache servers exist, in addition to 111, 121 and 131, the hash algorithm could produce that number of hash value options. Alternatively, the hash algorithm could produce a different number of hash value options, and load balancer 110 could use an additional method to further determine how to distribute the messages.

It should be understood that the connection tuple is presented only as an example of a portion of the message to process through the hash algorithm. In an implementation, the connection tuple may be modified before it is processed through the hash algorithm, for example.

In step 205, load balancer 110 forwards the request to one of cache servers 111, 121 or 131 based on the hash value. While cache servers 111, 121 and/or 131 may not have public network addresses, load balancer 110 can directly address communication to each of cache servers 111, 121 and 131. Thus, load balancer 110 can forward the request (or message, as discussed above) to the selected cache server 111, 121 or 131.

Figure 3:
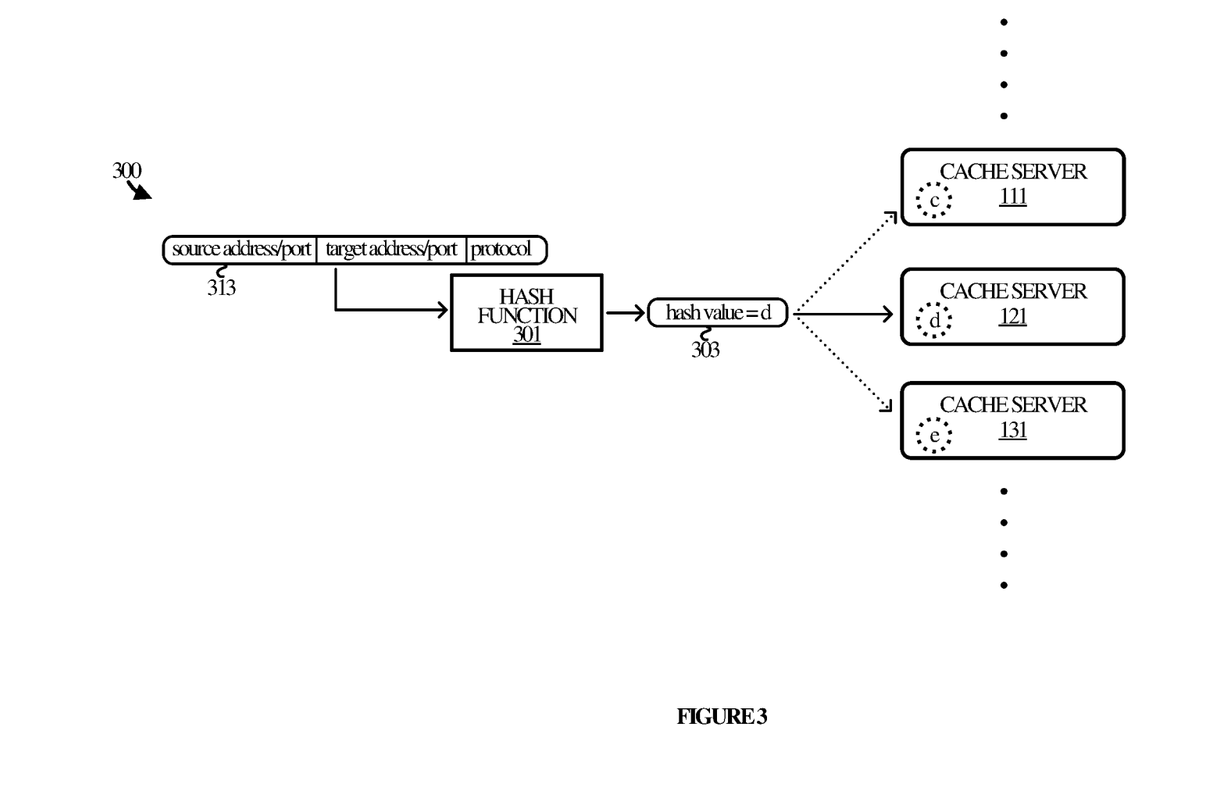
FIG. 3 illustrates a message distribution in an implementation.

The distribution process can be seen more clearly in FIG. 3. Hash function 301 is designed to process an incoming data segment, and repeatably produce a hash value. The incoming data segment can conform to an expected format and size, or the algorithm could be designed to accommodate varying incoming data streams. In an implementation, hash function 301 may be an off-the shelf hash function, such as may be included in off-the shelf software, integrated circuits or the like.

Connection tuple 313 is a portion of the incoming message that is processed by hash function 301. Connection tuple 313 can be designed to be any portion of the incoming message header or body, taken directly from the message, or modified. In an implementation, the incoming message is an IPv6 packet, and connection tuple 313 is a standard 5-tuple, taken directly from the packet header. Connection tuple 313 may contain, for example, a 128-bit source address, a 128-bit destination address, a 16-bit source port, a 16-bit destination port and an 8-bit protocol number. An IPv4 packet may instead contain 32-bit source and destination addresses.

When connection tuple 313 is processed through hash function 301, hash value 303 is produced. Here hash value 303 is depicted as "d," which correlates with cache server 121. As described above, hash function 301 may have a set number of possible hash values such as hash value 303 which correlates with the number of cache servers 111, 121 and 131. The number of available hash values may not correlate exactly with the number of cache servers 111, 121 and 131. In this case, load balancer will determine how to distribute the messages based on hash value 303. In an implementation, load balancer may desire to provide more messages to cache server 121, for example. Load balancer may assign two possible hash values to cache server 121, and only one hash value to cache server 111. In this way, load balancer could roughly double the number of messages provided to cache server 121 over cache server 111.

After receiving content requests, cache servers 111, 121 and 131 are sometimes able to respond directly to the content request with the content requested. In some cases, cache servers 111, 121 and/or 131 may not have the content desired in their cache. According to an embodiment, cache servers 111, 121 and 131 need to send out their own requests to one or more of origin servers 115 to retrieve the content. Origin servers 115 then direct a message back to cache servers 111, 121 or 131. When cache servers 111, 121 and/or 131 do not have public network addresses, origin servers 115 do not have an address to respond directly to cache servers 111, 121 or 131. Origin servers can direct the message to load balancer 110 (directly or through another component of the infrastructure service, as discussed above). Load balancer will then process the message through hash function 301 and forward the message to one of cache servers 111, 121, or 131.

Without some sort of direction, load balancer may forward a response message that is intended for cache server 111, for example, to cache server 121 instead. By manipulating a portion of the content request, cache server 111 can predetermine the hash value that will be produced when content is returned for cache server 111.

Figure 4:
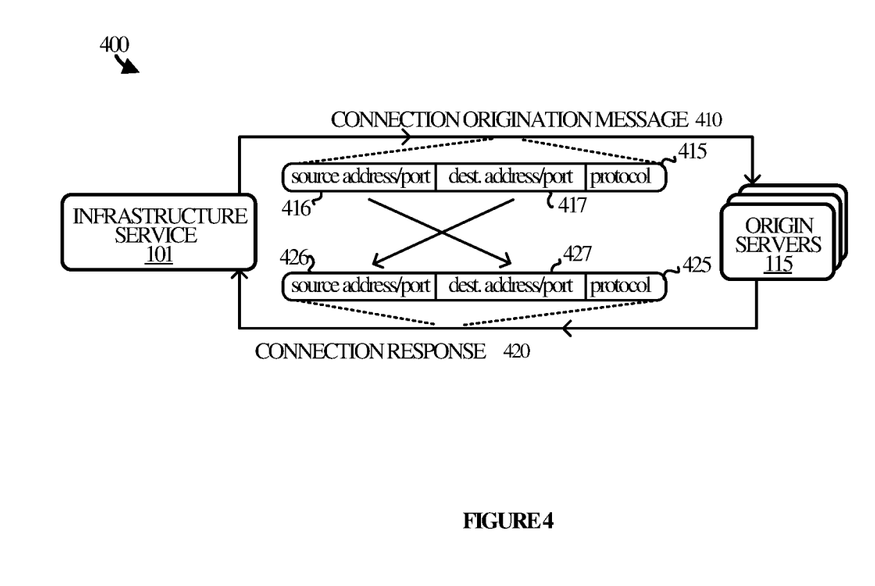
FIG. 4 illustrates an operational scenario in an implementation.

FIG. 4 illustrates an operational scenario for a content request from one of origin servers 115. Infrastructure service 101 sends a connection origination message 410 to one of origin servers 115. Connection origination message 410 contains a connection tuple 415. Connection tuple 415 can be a standard 5-tuple from the message header, as in an IPv4 or IPv6 message, for example. Infrastructure service 101 prepares connection tuple 415 as part of preparing connection origination message 410 to send to one of origin servers 115. Connection tuple 415 may be prepared by cache server 111, 121 or 131, load balancer 110 or some other element of infrastructure service 101.

After origin server 115 receives connection origination message 410, origin server prepares a reply message containing the content. This is shown as connection response 420. Connection response 420 also contains a connection tuple 425. In an implementation, connection tuple 425 contains identical information as connection tuple 415. The only change may be that origin server 115 has switched the source address and source port 416 with the destination address and destination port 417, producing the new source address and source port 426 and destination address and destination port 427. Note that according to an implementation, source address and source port 416 is identical to destination address and destination port 427. Further, destination address and destination port 417 is identical to source address and source port 426. Identical here can mean that the address and port addresses are identical, while the indication of source or destination has changed. Infrastructure service 101 may expect that origin server 115 will make these changes for the connection tuple in connection response 420. By expecting these changes, infrastructure service 101 can prepare in advance to route connection response 420 to the correct cache server 111, 121 or 131.

In an implementation, the protocol, destination address, destination port and source address are all predetermined. The protocol because it dictates the protocol for communication, the destination address and port because they are necessary to properly address the one of the origin servers 115, and the source address because the one of the origin servers 115 needs to know where to send the content. The source port can be used by infrastructure service 101 as desired to help direct connection response 420 to cache server 111, 121 or 131. In an implementation, infrastructure service can choose any applicable number for the source port. This source port can then be selected to allow hash function 301 to properly distribute connection response 420. While an origin server is shown in this embodiment, it should be understood that any external element could be addressed by this method.

Figure 5:
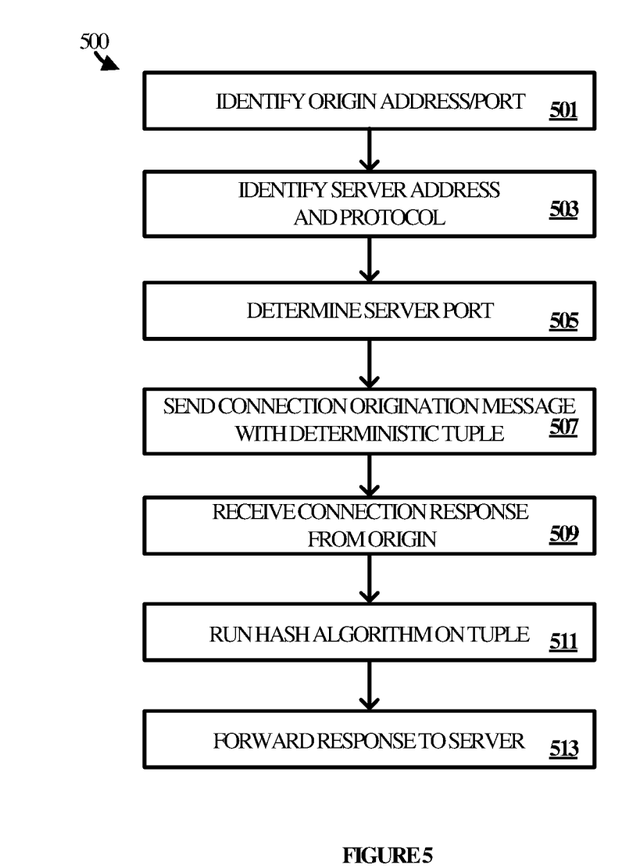
FIG. 5 illustrates a deterministic hash operation in an implementation.

This process is further described with regard to FIG. 5. In step 501, infrastructure service 101 (for example, cache server 111) identifies the network address and port for the origin server 115. The network address and port may be a public address that uniquely addresses origin server 115, or it may be a communal address that is shared between origin server 115 and some number of other network entities. The network address and port might alternatively address another cache server, user device or some other network element. In an implementation, the network address and port are previously identified and stored within the infrastructure service. The network address and port may have been provided by a user when origin server 115 set up service with infrastructure service 101, for example.

In step 503, infrastructure service 101 identifies the network address for cache server 111 and the communication protocol that will be used to communicate between cache server 111 and origin server 115. The network address for cache server 111 may not be a public network address that uniquely addresses cache server 111. The network address for cache server 111 may be a communal network address that addresses all of cache servers 111, 121 and 131. This could be accomplished by using a public network address for the infrastructure service 101 or for load balancer 110, which will then distribute the messages to cache server 111.

In step 503, infrastructure service 101 determines the server port. In an implementation, the server port will not actually be used to direct the message, but will instead be used to influence hash function 301 when connection response 420 is returned from origin server 115. Cache server 111 (or load balancer 110, or some other element of infrastructure service 101) will have knowledge of hash function 301. With advance knowledge of hash function 301, cache server 111 can select a connection tuple to produce a certain hash value. This is essentially a reverse hash function. Cache server 111 can select the hash value that corresponds to cache server 111. By way of example, this value was "c" in FIG. 4. Cache server 111 then completes a "reverse hash function" to determine what values the connection tuple could be to return connection response 420 to cache server 111. Since origin server 115 is expected to return the identical values in connection tuple 425 as cache server 111 provided in connection tuple 415, cache server 111 can determine, in advance, the hash value that will be produced when connection response 420 is returned to infrastructure service 101. Cache server 111 makes this advance determination by selecting the source port (which is expected to become the destination port in connection response 420) such that the expected connection tuple will result in a hash value of "c" after being processed by hash function 301.

After the source port has been selected, cache server 111 sends connection origination message 410 to origin server 115 in step 507. Origin server 115 receives connection origination message 410 (including connection tuple 415) and creates connection response 420. Origin server attaches the requested content to connection response 420 and attaches connection tuple 425 (with the source and destination switched, as expected). Origin server 115 then sends this message to the destination address, which was provided as the source address in connection origination message 410.

In step 509, load balancer 110 receives connection response 420 from origin server 115. In an implementation, load balancer 110 sees no difference between connection response 420 and any other content request. Therefore, in step 511, load balancer processes connection response just as any incoming content request would be handled, and load balancer 110 runs a portion of connection response 420 through hash function 301. In an implementation, this portion of connection response is the connection tuple 425. Since connection tuple 425 was already expected, and prepared through a reverse hash process, when load balancer processes connection response 420 through hash function 301, the resulting hash value instructs load balancer 110 to send connection response 420 to cache server 111. Load balancer 110 then forwards connection response 420 to cache server 111 in step 513. This forwarding may occur, in an implementation, over a private network, or through the use of a private network address.

Figure 6A:
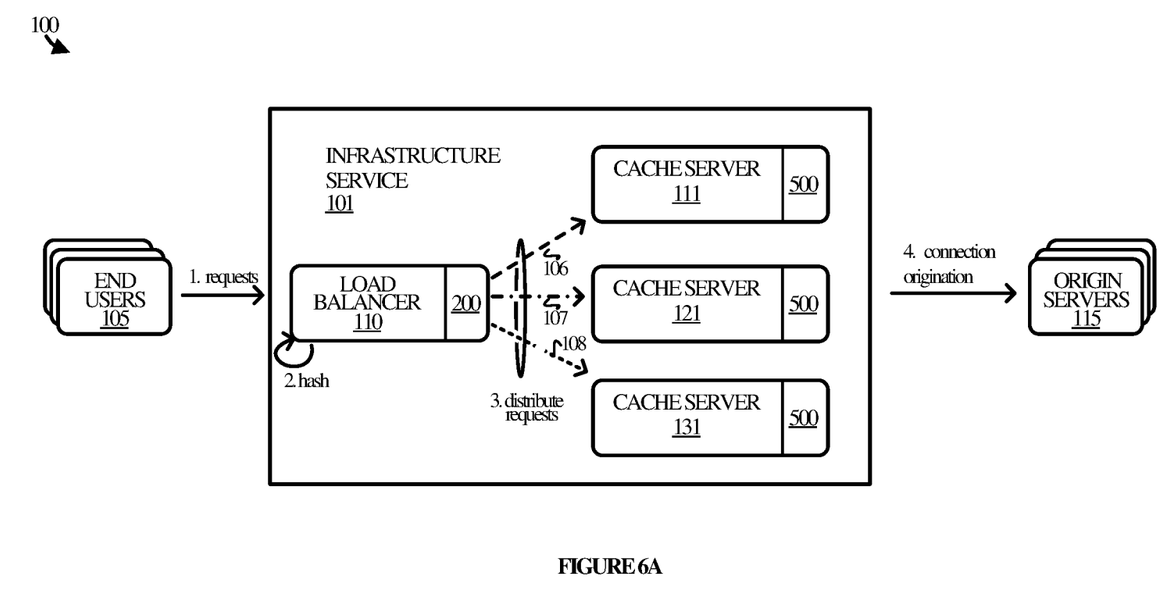
FIGS. 6A-6B illustrate an operational scenario in an implementation.
Figure 6B:
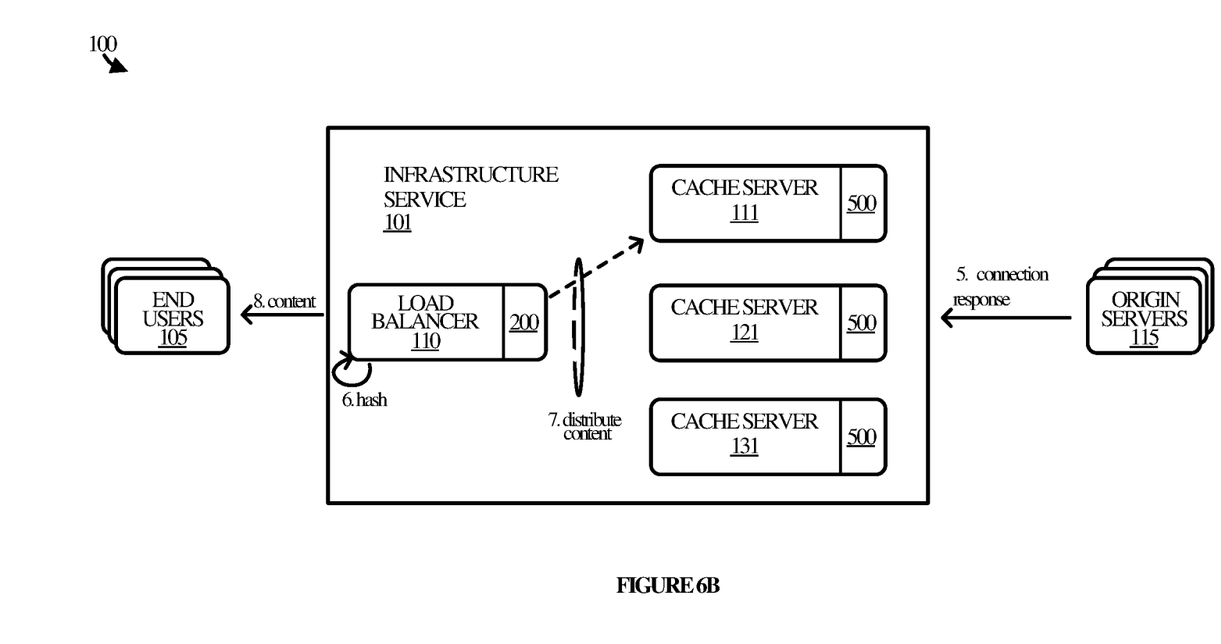

FIGS. 6A-6B illustrate Steps 1-8 of an operational scenario to further demonstrate the technical effects produced by load balancing process 200 as employed by load balancer 110 and the reverse hash process 500 as employed by cache servers 111, 121, and 131. Referring to FIG. 3A, end users 105 communicate packet traffic carrying requests for content to infrastructure service 101. The packet traffic may traverse one or more networks before reaching infrastructure service 101, such as a local area network, a wide area network, an Internet service provider network, an intermediate transit network, a backhaul network, and the like.

The traffic reaches infrastructure service 101 and is processed by load balancer 110 to determine where to send each packet. Load balancer 110 may employ a hash algorithm to distribute the traffic across cache servers 111, 121, and 131 in a generally even fashion. However, a variety of algorithms are possible, as well as a variety of conditions under which each algorithm may run, resulting in a variety of possible distributions. In this example, the incoming packet traffic is distributed such that portion 106 reaches cache server 111, portion 107 reaches cache server 121, and portion 108 reaches cache server 131.

Cache servers 111, 121, and 131 each process the requests in the respective portions of the packet traffic that load balancer 110 sends their way. This may include, for example, retrieving content from local storage or from origin servers 115 and sending the content to end users 105. In an implementation, cache servers 111, 121 and 131 are not publicly addressed. When cache servers 111, 121 or 131 send a connection origination message 410 to origin server 115, they may complete reverse hash process 500. In reverse hash process 500 cache server 111, for example, selects a source port that will cause load balancer 110 to direct a message to cache server 111 after being processed through hash function 301. The connection origination message 410 is then sent to origin server 115.

Referring to FIG. 6B origin servers 115 reply to connection origination message 410 with connection response 420. Connection response contains an expected portion of connection origination message 410. In an implementation, this portion is a connection tuple, including a protocol as provided in connection origination message 410, and source address and port and destination address and port which have been copied from connection origination message 410 in reverse (i.e., source becomes destination, destination becomes source).

The connection response is sent to infrastructure service 101 and received by load balancer 110. Load balancer processes connection response through hash function 301 to produce a hash result. Since connection origination message 410 was prepared through the reverse hash process 500, connection response produces a hash value that instructs load balancer 110 to forward connection response 420 to cache server 111. Cache server 111 receives connection response and stores the content to cache. Cache server 111 then prepares a content reply for the end user of end users 105 that originally sent the content request and sends the content reply to the end user.

Figure 7:
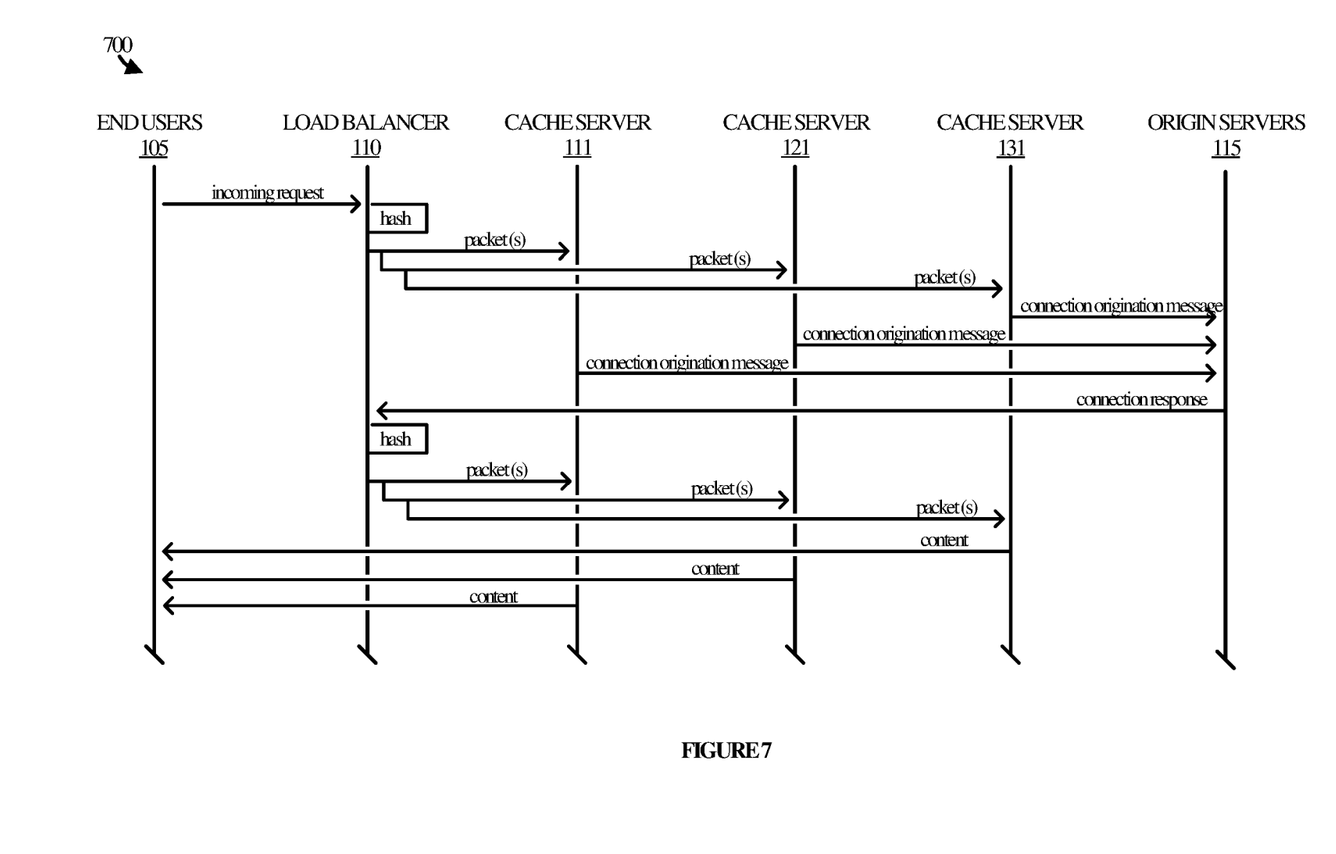
FIG. 7 illustrates an operational sequence in an implementation.

Operational scenario 700 in FIG. 7 further demonstrates the principles of deterministic hashing as contemplated herein and largely tracks the example provided in FIGS. 3A-3B.

In operation, end users 105 communicate packet traffic to load balancer 110. Load balancer 110 applies a hash algorithm to determine where to route the individual packets in the traffic. Some of the traffic is sent to cache server 111, while some is sent to cache server 121, and some is sent to cache server 131.

The cache servers 111, 121, and 131 generally reply to requests for content that may be included in the packets. The content may have been cached locally on a given server, may have been obtained from an origin server, or obtained from elsewhere.

The cache servers 111, 121, and 131 prepare connection origination messages for the origin servers using a reverse hash process. The cache servers 111, 121, and 131 select a source port that will produce a preselected hash value after it is returned from the origin servers 115. The cache server 111, 121, and 131 then send the connection origination messages to origin servers 115.

Origin servers 115 send a connection response back to load balancer 11 with the requested content. Note that while FIG. 7 shows only a single reply from origin servers 115, any number of reply messages may be sent by origin servers 115. The reply messages include a portion that is reproduces from the connection origination message, such as the connection tuple which can be a reordered reproduction of the connection tuple sent by cache servers 111, 121, and 131.

Load balancer 110 receives the content replies from origin servers 115 and processes them through hash function 301. The content replies are then routed, according to the hash values, back to the cache servers 111, 121 and 131 which requested the content from origin servers 115.

Cache servers 111, 121 and 131 then prepare content replies to send to end users 105 that originally requested the content.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements deterministic hash process 806, which is representative of the deterministic hash process discussed with respect to the preceding Figures. When executed by processing system 802 to provide a deterministic hash process, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including deterministic hash process 806) may be implemented in program instructions and among other functions may, when executed by processing system 802, direct processing system 802 to operate as described with respect to the various operational scenarios, sequences, and processes illustrated herein. For example, software 805 may include program instructions for implementing a redirect process to redirect packet traffic as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide packet redirection. Indeed, encoding software 805 on storage system 703 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating an infrastructure service that provides content to end users on behalf of an origin server, comprising:
    distributing incoming messages to a group of multiple servers communally addressed by a first address at least by processing a portion of a first incoming message through a hash function to produce first hash results, and using the first hash results to determine a first receiving server, from the group of multiple servers, to receive the first incoming message;
    selecting the first receiving server to receive content from the origin server;
    sending a request for first content to the origin server, the request comprising a tuple expected to be modified into a modified tuple, the modified tuple expected to be included in a reply message from the origin server, and the tuple configured such that the modified tuple processed through the hash function will produce second hash results, the second hash results configured to determine that the first receiving server will receive the reply message from the origin server;
    receiving the reply message, comprising the modified tuple from the origin server;
    processing the modified tuple through the hash function to produce the second hash results; and
    sending the reply message to the first receiving server.

2. The method of claim 1, wherein the tuple comprises a source address and a source port.

3. The method of claim 2, wherein the source address and source port are expected to be copied as a destination address and a destination port in the reply message.

4. The method of claim 1, wherein the tuple comprises source and destination elements, and wherein the modified tuple comprises the tuple with the source and destination elements switched.

5. The method of claim 1, wherein the portion of the first incoming message comprises a second tuple.

6. The method of claim 1, wherein the selecting step occurs responsive to the first receiving server receiving a content request from an end user for the first content, wherein the first content is not cached at the first receiving server.

7. The method of claim 6, further comprising sending the first content to the end user.

8. The method of claim 1, wherein the tuple is selected from a plurality of potential tuples, each potential tuple configured to predetermine results of the hash function such that the predetermined hash results determine that the first receiving server will receive the reply message from the origin server.

9. An infrastructure service comprising:
    A group of multiple servers communally addressed by a first address, comprising a first receiving server;
    A load balancer comprising:
        one or more computer readable storage media;

a processing system operatively coupled with the one or more computer readable storage media; and program instructions stored on the one or more computer readable storage media and configured to be executed by the processing system, wherein the program instructions, when executed by the processing system, instruct the load balancer to distribute incoming messages to the group of multiple servers at least by processing a portion of a first incoming message through a hash function to produce first hash results, and using the first hash results to determine the first receiving server to receive the first incoming message;

the first receiving server comprising:

one or more server computer readable storage media;

a server processing system operatively coupled with the one or more server computer readable storage media; and server program instructions stored on the one or more server computer readable storage media and configured to be executed by the server processing system, wherein the server program instructions, when executed by the server processing system, instruct the first receiving server to send a request for first content to an origin server, the request comprising a tuple expected to be modified into a modified tuple, the modified tuple expected to be included in a reply message from the origin server, and the tuple configured such that the modified tuple processed through the hash function will produce second hash results, the second hash results configured to determine that the first receiving server will receive the reply message from the origin server;

wherein the program instructions, when executed by the processing system, further instruct the load balancer to:

receive the reply message from the origin server;

process at least a portion of the reply message through the hash function to produce the predetermined hash results; and send the reply message to the first receiving server.

10. The infrastructure service of claim 9, wherein the tuple comprises a source address and a source port.

11. The infrastructure service of claim 10, wherein the program instructions, when executed by the processing system, expect the source address and source port to be copied as a destination address and a destination port in the reply message.

12. The infrastructure service of claim 9, wherein the tuple comprises source and destination elements, and wherein the reply message comprises the information expected to be copied with the source and destination elements switched.

13. The infrastructure service of claim 9, wherein the portion of the first incoming message comprises a tuple.

14. The infrastructure service of claim 9, wherein the tuple is selected from a plurality of potential tuples, each potential tuple configured to predetermine results of the hash function such that the predetermined hash results determine that the first receiving server will receive the reply message from the origin server.

* * * * *